M. & L. S. LACHMAN.
METHOD OF MAKING METALLIC FABRIC.
APPLICATION FILED MAR. 11, 1909.
974,892.
Patented Nov. 8, 1910.
FIG. 1
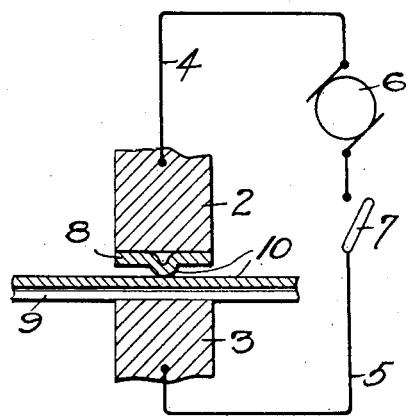
FIG. 2
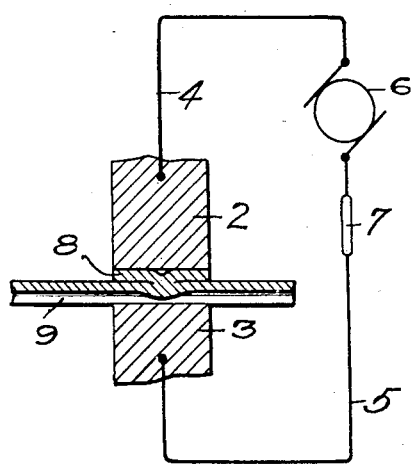
FIG. 6
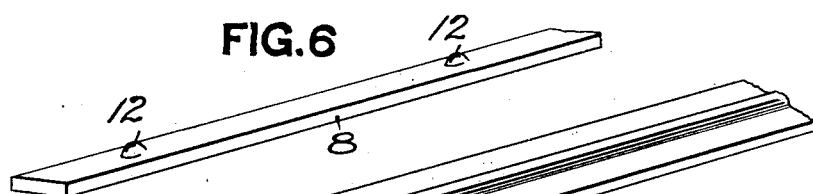
FIG. 3
FIG. 4
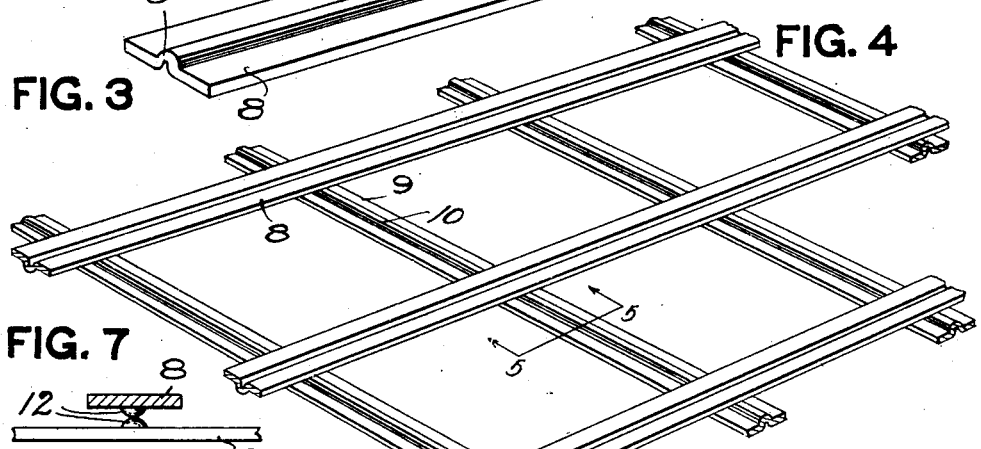
FIG. 7
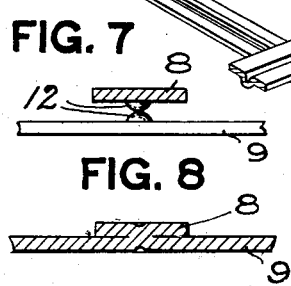
FIG. 8
FIG. 5
WITNESSES.
J. R. Keller
Robert C. Totten
INVENTORS
Maurice Lachman
Lawrence S. Lachman
By Kay & Totten
Attorneys

UNITED STATES PATENT OFFICE.

MAURICE LACHMAN AND LAURENCE S. LACHMAN, OF NEW YORK, N. Y., ASSIGNORS TO UNIVERSAL ELECTRIC WELDING CO., A CORPORATION OF NEW YORK.

METHOD OF MAKING METALLIC FABRIC.

974,892.  Specification of Letters Patent.  Patented Nov. 8, 1910.

Application filed March 11, 1909. Serial No. 482,823.

*To all whom it may concern:*

Be it known that we, MAURICE LACHMAN and LAURENCE S. LACHMAN, residents of New York, in the county of New York and State of New York, have invented a new and useful Improvement in Methods of Making Metallic Fabrics; and we do hereby declare the following to be a full, clear, and exact description thereof.

Our invention relates to a method of making a metallic fabric or structure, suitable for uses to which it may be found applicable.

One of the objects of our invention is to provide a method by means of which intersecting strips of metal may be rigidly united to form a rigid integral fabric or structure which may be made in any desired length and size to suit varying conditions.

Other objects will appear from the hereinafter description.

With these ends in view, our invention consists, generally stated, in the method of forming a metallic fabric or structure consisting in forming a projection or projections on at least one of the metal strips forming the said fabric or structure, placing another strip at an angle to the first strip and in contact with said projection or projections, and passing a current through the strips whereby sufficient resistance is created at the point of contact between said strips to bring the metal to a welding heat, and finally applying sufficient pressure to complete the weld. It is to be understood that the pressure is to be applied while the metal is in a plastic or welding condition. The time for this depends somewhat on the size of the strip and welding projection. In practice, the pressure is applied during the time that the strips are subjected to the electric current and may be prolonged beyond such time, if required.

In the accompanying drawing: Figure 1 is a diagrammatic view partly in section of a suitable apparatus for carrying out our improved method. Fig. 2 is a like view showing the position of the apparatus after the weld is completed. Fig. 3 is a perspective view of one form of the metal strip. Fig. 4 is a perspective view of a fabric or structure formed according to our improved method. Fig. 5 is a cross section on the line 5—5 of Fig. 4. Fig. 6 is a perspective view of a modified form of the strip. Fig. 7 is another view of said modification, and Fig. 8 is a cross section showing the welded joint.

We do not deem it necessary to illustrate in detail the form of electric welding apparatus for carrying out our invention, nor to illustrate the different forms and sizes of the strips which may be used in making the fabric or structure. The welding apparatus may be of any suitable character and the different parts of the same are accordingly indicated only diagrammatically.

The reference numeral 2 designates an upper die and 3 a lower die. The current is conducted to the dies by means of the wires 4 and 5 connected to the generator 6, a suitable switch 7 being provided in the circuit to turn on and off the current.

We have shown our invention as applied to comparatively thin, flat strips 8 and 9, but it is to be understood that we do not confine ourselves to such specific form of members. By the term "strip" it is to be understood that we intend to cover, and as a matter of fact, do cover members forming a fabric or structure having any desired thickness and width and any cross section other than circular. A fabric or structure embodying a circular member is shown, described and claimed in our companion case No. 482,822. A ridge or projection 10 is formed on either or both of said strips 8 and 9. The strips are placed intersecting with the ridge or ridges on one strip in contact with the other strip or the ridge thereon. When said strips or members have been assembled they are brought into proper position under the dies so that the said dies will operate at the point of intersection of said strips. The switch is turned to direct the current through the strips at the point of intersection. Owing to the projection or projections on the strip or strips, sufficient resistance to the current is created to raise the temperature of the metal at the point of contact to a welding heat, and at the proper time the upper die is lowered to cause sufficient pressure to be exerted to force the plastic metal together and complete the weld. When the ridge or projection is placed intermediate the outer edges of the strip, sufficient metal is provided on opposite sides of the projection to prevent the burning or melting away of the adjacent metal, as the only portion of the metal brought to a welding temperature is that forming the projection, the surrounding metal not being materially affected by the heat.

It is apparent that instead of using a projection in the form of a ridge extending longitudinally of the strip, teats or projections 12 may be formed at intervals on either or both strips, as indicated in Figs. 6 and 7. When the teats on one strip or member are brought into contact with the other strip or member, or the teats thereon, and the current applied, the welding will take place in the manner as hereinbefore set forth. While we have shown the projection, ridge or teat intermediate of the said strip, it is to be understood that it may be formed on such part and at such place on the strip as may be suitable for the particular fabric or structure being fabricated. In fact, it is to be understood that the invention is not limited to the kind, size or position or shape of the teat, ridge or projection illustrated and described.

By the herein described method we are able to produce a metal fabric or structure formed of strips or members so united as to produce a rigid integral fabric or structure, and by connecting the members together by a weld the said product may be rapidly fabricated and at low cost. Such a fabric or structure may be used for fences, grilles, reinforcement for concrete, and for any other use to which it may be applicable.

Having now described our invention, what we claim as new and desire to secure by Letters Patent is:

1. The method of forming a metallic fabric or structure, consisting in forming projections on flat strips in relation to each other with said projections in contact, passing a current through said strips at the point of intersection, the resistance to the passage of the current heating the metal at the points of contact to a welding heat, and applying pressure to complete the weld.

2. The method of forming a metallic fabric or structure, consisting in forming projections on strips of metal intermediate the edges thereof, bringing said strips into relation with each other with the said projections in contact, passing a current through said strips at the point of intersection, the resistance to the passage of the current heating the metal at the points of contact to a welding heat, and applying pressure to complete the weld.

3. The method of forming a metallic fabric or structure, consisting in forming longitudinally extending ridges on strips of metal, placing said strips with said ridges in contact, passing a current through said strips at the point of contact, the resistance to the passage of the current heating the metal at the point of contact to a welding heat, and applying pressure to complete the weld.

4. The method of producing a metallic fabric or structure formed of intersecting strips, consisting in forming a projection on one of the strips, placing another strip in contact with said projection, passing a current through said strips to raise the temperature of the metal at the point of contact to a welding heat and applying pressure.

5. The method of producing a metallic fabric or structure formed of intersecting strips, consisting in forming projections on said strips, crossing the strips so that the projections will be in contact, passing an electric current through said strips to raise the temperature of the metal at the point of contact to a welding heat and applying pressure.

6. The method of producing a metallic fabric or structure formed of intersecting members, consisting in forming projections on said members, crossing the members so that the projection on one member will be in contact with the other member or projection thereon, passing an electric current through said members to raise the temperature of the metal at the point of contact to a welding heat, and applying pressure.

In testimony whereof, we the said MAURICE LACHMAN and LAURENCE S. LACHMAN have hereunto set our hands.

MAURICE LACHMAN.
LAURENCE S. LACHMAN.

Witnesses:
REGINALD HAWLEY,
J. W. CORRIGAN.